United States Patent [19]

Daubach et al.

[11] 3,872,056

[45] Mar. 18, 1975

[54] MANUFACTURE OF PHENOL/FORMALDEHYDE RESINS

[76] Inventors: Ewald Daubach, 18 Verschaffelstrasse, 6700 Ludwigshafen; Hermann Windel, 15 Knietschstrasse, 6710 Frankenthal; Walter Boehm, 11 Mittlerer Waldweg, 6719 Kirchheim; Dieter Weiser, 14 Berliner Strasse; Manfred Herrmann, 23 Parkstrasse, both of 6700 Ludwigshafen, all of Germany

[22] Filed: Jan. 14, 1974

[21] Appl. No.: 433,361

[52] U.S. Cl. ............................. 260/49, 8/83, 8/89, 260/59 R
[51] Int. Cl. .............................................. C08g 5/06
[58] Field of Search .......................... 260/49, 59 R

[56] References Cited
UNITED STATES PATENTS

| 2,233,875 | 3/1941 | Schmidt et al. | 154/2 |
| 2,870,041 | 1/1959 | Waddle et al. | 117/62 |
| 3,062,783 | 11/1962 | Gray et al. | 260/49 |
| 3,230,197 | 1/1966 | Adolphson | 260/49 |
| 3,677,979 | 7/1972 | Beaulieu | 260/2.2 |
| 3,687,603 | 8/1972 | Abel et al. | 8/23 |

*Primary Examiner*—Lester L. Lee
*Attorney, Agent, or Firm*—Johnston Keil, Thompson & Shurtleff

[57] ABSTRACT

Manufacture of phenol/formaldehyde resins containing sulfo groups from phenols, formaldehyde or formaldehyde-donating substances and quadrivalent sulfur compounds at temperatures above 125°C.

1 Claim, No Drawings

MANUFACTURE OF PHENOL/FORMALDEHYDE RESINS

This invention relates to an improved process for the manufacture of phenol/formaldehyde condensates containing aliphatically combined sulfo groups.

It is known that in the manufacture of powdered or pasty dispersions of insoluble dyes such as vat dyes or disperse dyes, or of pigments, use may be made, inter alia, of dispersing agents prepared by condensing various aromatic compounds such as unsubstituted or substituted phenols or naphthols with formaldehyde and/or other condensable systems followed by or accompanied by the introduction of sulfo groups. In most cases, the sulfo group is present in the aromatic nucleus. Such condensates are obtainable according to the teaching of German Patent Nos. 687,066 and 701,563, where they are described as tanning agents.

German Patent No. 1,130,822 teaches that certain representatives of these condensates may also be used as dispersing agents.

German Patent No. 1,178,081 describes the use of such condensates as dye auxiliaries.

German Published Application No. 1,469,664 expressly recommends the use of sulfo group-containing phenol/formaldehyde condensates as dye auxiliaries, i.e. dispersing agents for dyes which are sparingly soluble or insoluble in water.

All of these references teach that the sulfo groups present in the condensates are aromatically combined.

German Published Application No. 2,032,926 teaches the manufacture and use of sulfo group-containing phenol/formaldehyde condensates as dispersing agents for dyes, in which the sulfo groups have been produced by the action of sulfites, i.e. are aliphatically combined. This reference proposes molar ratios of phenol to formaldehyde to sulfite of 1:1:0.3 to 1:4:1.6.

This reference is characterized by the disclosure that the condensates are obtained at relatively low temperatures of from 80° to 120°C and that the starting phenols are preferably substituted phenols.

Although the above reference also proposes the use of phenol itself as a starting compound in the preparation of these condensates, it has been found that when phenol is used at a relatively low condensation temperature of from approx. 80° to 120°C as suggested in said reference the products obtained do not have an optimum dispersing action, i.e. their dispersing action is distinctly inferior to that of products obtained with the preferred substituted phenols.

It is an object of the invention to make it possible to use phenol as starting material, this object being mainly based on the fact that the toxicity of substituted phenols is generally higher than that of phenol itself.

It is also desirable that new dispersing agents provide better and more brilliant colorations when dyes are dispersed therein.

These and other objects and advantages of the invention are achieved by a process for the manufacture of sulfo group-containing phenol/formaldehyde condensates on the basis of alkaline condensation of phenols, formaldehyde or formaldehyde-donating substances and sulfite and/or bisulfite and alkali metal hydroxide at elevated temperature, which phenols, formaldehyde or formaldehyde-donating substances, sulfite and/or bisulfite and alkali metal hydroxide are used in the condensation in molar ratios of from 1:1.0:0.3:0.05 to 1:4:1.6:0.5, wherein condensation is effected using phenol itself as starting material and at temperatures of from 125° to 200°C.

The invention also relates to the use of condensates produced in the invention as dispersing agents for dyes.

In view of the increasing practical requirements which are being placed on dye formulations, for example for use in continuous and high-temperature processes and also in pigment padding processes, it has been necessary to develop dispersing agents which have a very high stabilizing action. The prior art compounds developed less recently have only a low stabilizing effect, whilst those disclosed in the last-named reference are derived from very expensive and not readily available starting materials or from materials whose toxicity does not meet the new laws on environmental pollution in a number of countries.

The manufacture of the dispersing agents as proposed in the present invention is based on a known reaction in which phenol, formaldehyde or formaldehyde-donating substances and sulfite and/or bisulfite, preferably sodium sulfite or sodium bisulfite, are allowed to react with each other in the presence of alkali metal hydroxides such as sodium hydroxide at alkaline pH's of from about 11 to 15 and preferably from 12 to 14 with vigorous agitation, e.g. stirring, in a pressure vessel at temperatures of from 125° to 200°C and preferably from 140° to 160°C over a period of from about 1 to 6 hours and preferably from 2 to 4 hours, the concentration of the batch being from 20 to 50% by weight of dry substance. Any alkaline medium other than caustic soda may be used, but the use of other bases is usually of no added advantage.

Suitable formaldehyde-donating substances are those which eliminate formaldehyde at the temperatures used, examples being formaldehyde derivatives such as paraformaldehyde or, preferably, formaldehyde/bisulfite condensates. When the latter products are used, further bisulfite or further formaldehyde must be added to maintain the desired ratio as defined above.

The ratio of the reactants is held within the limits defined above. Particularly favorable properties as regards the dispersing action achieved by the agents manufactured according to the present invention are obtained when the molar ratio of phenol to formaldehyde to sulfite to NaOH is that produced when the reactants are used in proportions of from 1:2.5:0.65:0.18 to 1:3:0.8:0.25. Similar favorable ratios are obtained when the proportions are approx. 1:approx. 1.3:approx. 0.54:0.13. These favorable ratios are realized by the following structures:

Structure 1

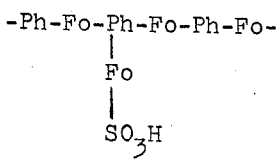

Structure 2

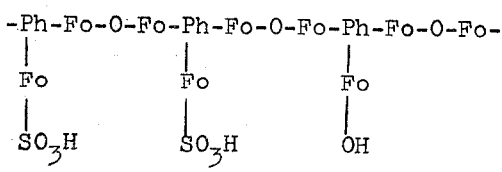

The structure 1 illustrates the first and structure 2 the last of the ratios stated above. In the schemes 1 and 2 Ph denotes phenol and Fo denotes a $CH_2$ bridge.

The dispersing agents to be used according to the invention are excellent in their property of stabilizing dye dispersions, particularly vat dye and disperse dye formulations. Our dispersing agents are particularly significant in the formulation of dye compositions containing disperse dyes. Such a dye composition is prepared in known manner, for example by preparing a paste from 2 to 30% and preferably from 5 to 20% by weight of the agent proposed in the present invention and from 10 to 55% by weight of dye, the amount of dye being preferably from 2 to 4 times the amount of dispersing agent, and from about 10 to 20% of a glycol or some other water-retaining agent. A pH of, say, 9 is obtained by adding a dilute acid, preferably sulfuric or acetic acid, and the whole is then made up to 100% with water. The mixture is then milled to the required degree of fineness in, say, a glass mill or some other dispersing apparatus, the milling temperature being from 20° to 90° C. The dispersion thus obtained has excellent storage stability and heat stability.

Colorations and prints obtained with dye formulations containing the agents of the invention are distinguished by a high degree of brilliance and levelness. In particular, good results have been achieved in thermosol processes such as are commonly used for dyeing synthetic fibers for example.

It is not necessary to describe the dyeing processes in detail in this specification, since these are well known to the man skilled in the art.

In the following Examples the parts are by weight.

EXAMPLE 1

9 parts of dispersing agent, prepared by alkaline condensation of 1 mole of phenol, 1.3 moles of formaldehyde, 0.54 mole of sodium sulfite ($Na_2SO_3$) and 0.13 mole of NaOH at 140°C in an autoclave, are mixed to a paste with 18 parts of Disperse Blue (C.I. No. 61515, 100%), 10 parts of glycol and a little water. The mixture is then adjusted to pH 9 with 10% $H_2SO_4$ and made up to 100 parts with water. The mixture is triturated for 15 hours in a glass mill. There is obtained a very fine dispersion having excellent storage and heat stabilities.

EXAMPLE 2

9 parts of a dispersing agent, prepared by alkaline condensation of 1 mole of phenol, 2.5 moles of formaldehyde, 0.67 mole of sodium sulfite ($Na_2SO_3$) and 0.2 mole of NaOH at 150°C in an autoclave, are mixed to a paste with 18 parts of Disperse Blue (C.I. No. 61515, 100%), 10 parts of glycol and a little water. The mixture is adjusted to pH 9 with 10% $H_2SO_4$ and then made up to 100 parts with water. It is triturated in a glass mill for 15 hours. There is obtained a very fine dispersion having excellent storage and heat stabilities.

EXAMPLE 3

10 parts of dispersing agent, prepared by alkaline condensation of 1 mole of phenol, 2.8 moles of formaldehyde, 0.81 mole of sodium sulfite ($Na_2SO_3$) and 0.25 mole of NaOH at 140°C in an autoclave, are mixed to a paste with 20 parts of Disperse Red (C.I. No. 11040, 100%), 10 parts of glycol and a little water. The mixture is adjusted to pH 8.5 with dilute HCl and made up to 100 parts with water. To achieve a fine state of subdivision, the mixture is then triturated for 15 hours in a glass mill. The resulting dispersions show extremely good storage and heat stabilities.

EXAMPLE 4

10 parts of dispersing agent, prepared by alkaline condensation of 1 mole of phenol, 2.5 moles of formaldehyde, 0.67 mole of sodium sulfite ($Na_2SO_3$) and 0.2 mole of NaOH at 170°C in an autoclave, are mixed to a paste with 20 parts of Disperse Red (C.I. No. 11040, 100%), 10 parts of glycol and a little water. The mixture is adjusted to pH 8.5 with dilute HCl and made up to 100 parts with water. It is then triturated in a glass mill for 15 hours. There are obtained fine dispersions showing good storage and heat stabilities.

EXAMPLE 5

10 parts of dispersing agent, prepared by alkaline condensation of 1 mole of phenol, 2.8 moles of formaldehyde, 0.91 mole of sodium sulfite ($Na_2SO_3$) and 0.25 mole of NaOH at 140°C in an autoclave, are mixed to a paste with 20 parts of Disperse Red (C.I. No. 11040, 100%), 10 parts of glycol and a little water. The mixture is then adjusted to pH 8.5 with dilute HCl and made up to 100 parts with water. Following trituration in a glass mill there is obtained a fine dispersion showing good storage and heat stabilities.

EXAMPLE 6

20 parts of dispersing agent, prepared as described in Example 1 or 4, are mixed to a paste with 40 parts of a 50% filter cake of the dye C.I. No. 48005 and 40 parts of water and then milled in a sand mill or ball mill until the degree of dispersion satisfies the usual tests (filter test as proposed by Schlottmann in Textil-Praxis, January 1957, page 63 and centrifugal test as proposed by Richter and Vescia in Melliand-Textilberichte 6, 1965, page 622). The resulting dispersion is dried to a powder using a spray dryer in which the carrier gas has an initial temperature of about 150°–250°C. The resulting powder, when stirred into water, gives a very fine dispersion which is suitable for coloring and printing polyester fabrics.

EXAMPLE 7

20 parts of dispersing agent, prepared as in Example 1, are stirred together with 50 parts of a 40% filter cake of the dye C.I. No. 62015 and 30 parts of water and then milled in a glass mill after the pH has been adjusted to 8. When the required degree of dispersion has been attained, the mixture is spray-dried. The resulting powder, when stirred into water, forms a very fine dispersion and is suitable for coloring and printing polyester fabrics.

EXAMPLE 8

15 parts of dispersing agent, prepared as in Example 1, are mixed with 15 parts of the dye C.I. No. 59825 (C.I. Vat Green) (100%) and milled in a sand mill. When the degree of dispersion required for vat dyes has been attained, the dispersion is spray-dried. There is obtained a powder which, when stirred into water, gives a very fine dispersion which is suitable for dyeing and printing cotton fabrics.

We claim:

1. In a process for the manufacture of sulfo group-containing phenol/formaldehyde condensates on the basis of alkaline condensation of phenols, formaldehyde or formaldehydedonating substances, a compound selected from the group consisting of sodium sulfite and sodium bisulfite and alkali metal hydroxide at elevated temperature, which phenols, formaldehyde or formaldehyde-donating substances, compound selected from the group consisting of sodium sulfite and sodium bisulfite and alkali metal hydroxides are used in the condensation in molar ratios of from 1:1.0:0.3:0.05 to 1:4:1.6:0.5, wherein the improvement comprises effecting condensation using phenol itself as starting component at temperatures of from 125° to 200°C.

* * * * *